(12) United States Patent
Patarin et al.

(10) Patent No.: US 7,658,909 B2
(45) Date of Patent: Feb. 9, 2010

(54) PROCESS FOR PREPARING A BETA ZEOLITE

(75) Inventors: Joël Patarin, Flaxlanden (FR); Philippe Caullet, Illzach (FR); Jean-Louis Paillaud, Mulhouse (FR); Nicolas Bats, Feyzin (FR)

(73) Assignee: Institut Francais du Petrole, Rueil Malmaison Cedex (FR)

( * ) Notice: Subject to any disclaimer, the term of this patent is extended or adjusted under 35 U.S.C. 154(b) by 0 days.

(21) Appl. No.: 12/062,975

(22) Filed: Apr. 4, 2008

(65) Prior Publication Data

US 2009/0068091 A1    Mar. 12, 2009

(30) Foreign Application Priority Data

Apr. 5, 2007    (FR) .................................. 07 02490

(51) Int. Cl.
*C01B 33/36* (2006.01)
*C01F 7/00* (2006.01)
*C01B 39/00* (2006.01)

(52) U.S. Cl. ............... 423/705; 423/DIG. 27; 502/64

(58) Field of Classification Search ......... 423/700–705, 423/706, 708, 709, DIG. 27; 502/60, 64, 502/73; 510/315, 507

See application file for complete search history.

(56) References Cited

U.S. PATENT DOCUMENTS

2002/0090337 A1 *  7/2002  Corma Canos et al. ...... 423/700
2007/0117711 A1 *  5/2007  Caullet et al. ................. 502/60

FOREIGN PATENT DOCUMENTS

FR          2 652 347 A         3/1991
FR          2 887 246 A         12/2006
WO      WO 2006134249 A1 *   12/2006

OTHER PUBLICATIONS

Camblor M A et al: "High Silica Zeolites With Three-Dimensional Systems of Large Pore Channels" Microporous and Mesoporous Materials, Elsevier Science Publishing, New York, US, vol. 48, No. 1-3, (Nov. 11, 2001), pp. 11-22, XP004311191.

* cited by examiner

*Primary Examiner*—Steven Bos
*Assistant Examiner*—Pritesh Darji
(74) *Attorney, Agent, or Firm*—Millen, White, Zelano & Branigan, P.C.

(57) ABSTRACT

A process for preparing a beta zeolite is described, comprising at least the following steps:
i) mixing, in an aqueous medium, at least one source of at least one tetravalent element X, at least one source of fluoride anions and at least one quaternary ammonium salt with formula $(H_3C)_2-N^+-(CH_2CH_2C(CH_3)_3)_2$;
ii) treating said mixture hydrothermally until said beta zeolite is formed.

20 Claims, No Drawings

PROCESS FOR PREPARING A BETA ZEOLITE

CROSS-REFERENCE TO RELATED APPLICATION

Application Ser. No. 11/638,352 filed Dec. 14, 2006 entitled "EUO-STRUCTURAL TYPE ZEOLITE THAT CONTAINS THE N,N-DIMETHYL-N,N-DI(3,3-DIMETHYLBUTYL)AMMONIUM CATION AND ITS PROCESS FOR PREPARATION" by Caullet et al.

FIELD OF THE INVENTION

The present invention relates to a novel process for preparing a beta zeolite, carried out in the presence of an organic template species comprising a quaternary ammonium function. Said beta zeolite obtained using the process of the invention is advantageously of application as a catalyst, adsorbant or separating agent.

PRIOR ART

Crystalline microporous materials such as zeolites or silicoaluminophosphates are solids which are widely used in the oil industry as a catalyst, catalyst support, adsorbant or separating agent. Although many microporous crystalline structures have been discovered, the refining and petrochemicals industries is constantly researching novel zeolitic structures which have particular properties for applications such as purification or separation of gas, converting carbon-containing species or other applications.

Beta zeolite is a known solid which is described as being constituted by a highly disordered intergrowth of two polymorphs, polymorph A and polymorph B, which are usually found in a ratio of 60:40 (J. M. Newsam et al., Proc. R. Soc., London A, 420, 375 (1988).

Many methods for preparing beta zeolites have also been described in the literature. Many of these methods use an organic species as a template for the preparation of a beta zeolite. Camblor et al in Microporous and Mesoporous Materials, 48, 11-22 (2001) propose a number of examples of organic species which allow the synthesis of beta zeolites such as tetraethylammonium, 6-azoniaspiro [5,5]undecane, N,N,N,N',N',N'-hexamethyldecane-1,10-diammonium cations. Arranz et al. in Stud. Surf. Sci. Catal. 154, 257-264 (2004) describe the use of the dibenzyldimethylammonium cation as an organic template species in the synthesis of beta zeolite.

BRIEF DESCRIPTION OF THE INVENTION

The present invention pertains to a process for preparing a beta zeolite, comprising at least the following steps:
i) mixing, in an aqueous medium, at least one source of at least one tetravalent element X, at least one source of fluoride anions and at least one quaternary ammonium salt with formula $(H_3C)_2-N^+-(CH_2CH_2C(CH_3)_3)_2$;
ii) treating said mixture hydrothermally until said beta zeolite is formed.

It has been discovered that said quaternary ammonium salt with formula $(H_3C)_2-N^+-(CH_2CH_2C(CH_3)_3)_2$ mixed with at least one source of at least one tetravalent element, at least one source of fluoride anions and water results in the production of a high purity beta zeolite. All other crystalline or amorphous phases are generally and highly preferably absent from the crystalline solid constituted by beta zeolite obtained at the end of the preparation process.

DETAILED DESCRIPTION OF THE INVENTION

The present invention concerns a process for preparing a beta zeolite, comprising at least the following steps:
i) mixing, in an aqueous medium, at least one source of at least one tetravalent element X, at least one source of fluoride anions and at least one quaternary ammonium salt with formula $(H_3C)_2-N^+-(CH_2CH_2C(CH_3)_3)_2$;
ii) treating said mixture hydrothermally until said beta zeolite is formed.

In accordance with the process of the invention, the quaternary ammonium salt with formula $(H_3C)_2-N^+-(CH_2CH_2C(CH_3)_3)_2$, corresponding to the cation N,N-dimethyl-N,N-di(3,3-dimethylbutyl)ammonium, acts as a template for the beta zeolite prepared using the process of the invention. The N,N-dimethyl-N,N-di(3,3-dimethylbutyl)ammonium salt introduced into the mixture to carry out step i) of the process of the invention may be a N,N-dimethyl-N,N-di(3,3-dimethylbutyl)ammonium halide, hydroxide, sulphate, silicate or aluminate. Highly preferably, the quaternary ammonium salt used to carry out said step i) of the process of the invention is N,N-dimethyl-N,N-di(3,3-dimethylbutyl) ammonium hydroxide. This species, in its hydroxide form, can be obtained from a N,N-dimethyl-N,N-di(3,3-dimethylbutyl)ammonium halide. Preferably, the N,N-dimethyl-N,N-di(3,3-dimethylbutyl)ammonium hydroxide is obtained by treatment, at ambient temperature, of a solution of N,N-dimethyl-N,N-di(3,3-dimethylbutyl)ammonium bromide with silver oxide. N,N-dimethyl-N,N-di(3,3-dimethylbutyl)ammonium bromide may be prepared using methods which are known to the skilled person. One possible method for preparing N,N-dimethyl-N,N-di(3,3-dimethylbutyl)ammonium bromide is given in the following reaction scheme:

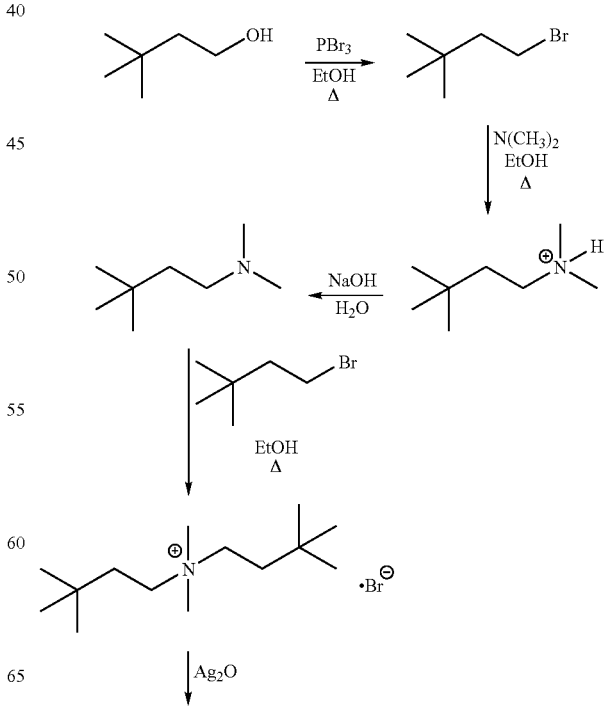

-continued

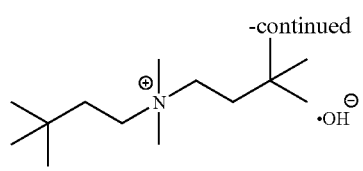

In accordance with the invention, at least one source of at least one tetravalent element X is incorporated into the mixture for carrying out step i) of the preparation process. X is preferably selected from silicon, titanium and a mixture of these two tetravalent elements; highly preferably, X is silicon. The source or sources of said tetravalent element(s) may be any compound comprising the element X and which can liberate this element in aqueous solution in a reactive form. The element X may be incorporated into the mixture in an oxidized form $XO_2$ or in any other form. When X is titanium, then $Ti(EtO)_4$ is advantageously used as the source of titanium. In the preferred case in which X is silicon, the source of silicon may be any one of the sources currently employed for zeolite synthesis, for example silica powder, silicic acid, colloidal silica, dissolved silica or tetraethoxysilane (TEOS). Examples of silica powder which may be used are precipitated silicas, especially those obtained by precipitation from a solution of alkali metal, pyrogenated silicas, for example "CAB-O-SIL", and silica gels. Colloidal silicas with various particle sizes may be used, for example with a mean equivalent diameter in the range 10 to 15 nm or in the range 40 to 50 nm, such as those sold under registered trade marks such as "LUDOX". Preferably, the source of silicon is tetraethoxysilane (TEOS).

In accordance with the invention, at least one source of fluoride anions $F^-$ is employed to carry out step i) of the preparation process of the invention. The source of fluoride anions used may be a fluoride salt such as $NH_4F$, NaF, KF, LiF or a mixture of at least two of these salts, or hydrofluoric acid HF. Preferably, the source of fluoride anions is hydrofluoric acid HF in aqueous solution.

In accordance with a first preferred implementation of the process of the invention, at least one source of at least one trivalent element Y is incorporated into the mixture to carry out said step i) of the preparation process of the invention. Said trivalent element Y is selected from aluminum, boron, iron, indium, gallium and a mixture of at least two of these trivalent elements; highly preferably, Y is aluminum. The source or sources of said trivalent element(s) may be any compound comprising the element Y which can liberate that element in aqueous solution in a reactive form. The element Y may be incorporated into the mixture in an oxidized form $YO_n$ with $1 \leq n \leq 3$ (n being a whole number or a rational number), or in any other form. In the preferred case in which Y is aluminum, the source of aluminum is preferably sodium aluminate, or an aluminum salt, for example a chloride, a nitrate, a hydroxide or a sulphate, an aluminum alkoxide, for example aluminum isopropoxide, or alumina proper, preferably in the hydrated or hydratable form, such as colloidal alumina, pseudoboehmite, gamma alumina or alpha or beta trihydrate. It is also possible to use mixtures of the sources cited above.

In a second preferred implementation of the process of the invention, at least one alkali and/or alkaline-earth metal M is incorporated into the mixture to carry out said step i) of the preparation process of the invention and is selected from lithium, potassium, sodium, magnesium and calcium and a mixture of at least two of these metals. Preferably, said metal M is an alkali metal; highly preferably, it is sodium.

In accordance with the preparation process of the invention, the reaction mixture obtained in step i) has a molar composition expressed by the formula $XO_2$: $vYO_n$: $wM_{2/m}O$: $xF^-$: $yH_2O$: $zR^+$, in which:

v is in the range 0 to 0.5, preferably in the range 0.01 to 0.3;
w is in the range 0 to 1, preferably in the range 0.01 to 0.5;
x is in the range 0.05 to 2, preferably in the range 0.1 to 1.5;
y is in the range 1 to 50, preferably in the range 2 to 10;
z is in the range 0.01 to 6, preferably in the range 0.05 to 4;
n is in the range 1 to 3 (n being a whole number or a rational number);
m is equal to 1 or 2;

and in which X, Y or M have the same meanings as those given above, namely X is one or more tetravalent element(s) selected from the group formed by the following elements: silicon and titanium; highly preferably, X is silicon; Y is one or more trivalent element(s) selected from the group formed by the following elements: aluminum, iron, boron, indium and gallium; highly preferably, Y is aluminum; and M is one or more alkali and/or alkaline-earth metal(s) selected from lithium, sodium, potassium, calcium, magnesium and calcium and a mixture of at least two of these metals; highly preferably, M is sodium; $R^+$ is the quaternary ammonium cation N,N-dimethyl-N,N-di(3,3-dimethylbutyl)ammonium; v, w, x, y and z respectively represent the number of moles of $YO_n$, $M_{2/m}O$, $F^-$, $H_2O$ and $R^+$.

Step i) of the process of the invention consists of preparing an aqueous reaction mixture termed a gel and comprising at least one source of at least one tetravalent element X, preferably an oxide $XO_2$, optionally at least one source of at least one trivalent element Y, preferably an oxide $YO_n$, at least one salt of N,N-dimethyl-N,N-di(3,3-dimethylbutyl)ammonium, at least one source of fluoride anions, optionally at least one source of one or more alkali and/or alkaline-earth metal(s). The quantities of said reactants are adjusted to endow this gel with a composition allowing it to crystallize into a beta zeolite.

It may be advantageous to add seeds to the reaction mixture during said step i) of the process of the invention to reduce the time necessary for crystals of beta zeolite to form and/or to reduce the total crystallization time. Said seeds also encourage the formation of said beta zeolite to the detriment of the impurities. Such seeds comprise crystalline solids, especially crystals of beta zeolite. The crystalline seeds are generally added in a proportion in the range 0.01% to 10% of the mass of the source of the element X, preferably the oxide $XO_2$, used in the reaction mixture.

In accordance with step ii) of the process of the invention, the gel undergoes a hydrothermal treatment, preferably carried out at a temperature in the range 80° C. to 200° C., until the beta zeolite is formed. The gel is advantageously placed under hydrothermal conditions under an autogenous reaction pressure, optionally by adding gas, for example nitrogen, at a temperature in the range 80° C. to 200° C., preferably in the range 140° C. to 180° C., until the beta zeolite crystals are formed. The time necessary to obtain crystallization generally varies from 1 to 50 days, preferably in the range 1 to 21 days and more preferably in the range 5 to 16 days. The reaction is generally carried out with stuffing or in the absence of stirring, preferably in the presence of stirring.

At the end of the reaction, when said beta zeolite is formed after carrying out said step ii) of the preparation process of the invention, the solid phase formed from beta zeolite is filtered, washed and dried. Drying is generally carried out at a temperature in the range 20° C. to 150° C., preferably in the range 60° C. to 120° C., for a period in the range 5 to 20 hours. The dried beta zeolite is generally analyzed by X ray diffraction, this technique also allowing the purity of said zeolite obtained by the process of the invention to be determined. Highly advantageously, the process of the invention results in the formation of a beta zeolite, in the absence of any other crystalline or amorphous phase. Said zeolite, after the drying step, is then ready for subsequent steps such as calcining and ion exchange. For these steps, any conventional method which is known to the skilled person may be employed.

Calcining of the beta zeolite obtained using the process of the invention is preferably carried out at a temperature in the range 500° C. to 700° C. for a period in the range 5 to 15 hours. The beta zeolite obtained at the end of the calcining period is free of any organic species and in particular of the quaternary ammonium salt with formula $(H_3C)_2$—$N^+$—$(CH_2CH_2C(CH_3)_3)_2$.

As a general rule, the cation or cations M of the beta zeolite obtained by the process of the invention may be replaced any metal cation or cations, in particular those from groups IA, IB, IIA, IIB, IIIA, IIIB (including the rare earths), VIII (including the noble metals) as well as lead, tin and bismuth. Exchange is carried out using any hydrosoluble salts containing the appropriate cation.

It is also advantageous to obtain the hydrogen form of the beta zeolite obtained by the process of the invention. Said hydrogen form may be obtained by carrying out ion exchange with an acid, in particular a strong mineral acid such as hydrochloric, sulphuric or nitric acid, or with a compound such as ammonium chloride, sulphate or nitrate. Ion exchange may be effected by suspending said beta zeolite with the ion exchange solution one or more times. Said zeolite may be calcined before or after ion exchange, or between two ion exchange steps. Preferably, the zeolite is calcined before ion exchange to eliminate any organic substances included in the pores of the zeolite, to facilitate ion exchange.

The beta zeolite obtained by the process of the invention may be used after ion exchange as an acidic solid for catalysis in the fields of refining and petrochemicals. It may also be used as an adsorbant to control pollution or as a molecular sieve for separation.

As an example, when used as a catalyst, the zeolite prepared using the process of the invention is calcined, exchanged and is preferably in the hydrogen form, and may be associated with an inorganic matrix, which may be inert or catalytically active, and with a metallic phase. The inorganic matrix may be present simply as a binder to hold the small particles of zeolite in the various known forms of catalysts together (as extrudates, pellets, beads, powders), or it may be added as a diluent to set the degree of conversion on a process which would occur otherwise at too high a rate leading to choking of the catalyst as a result of too much coke formation. Typical inorganic matrices are support substances for catalysts such as silica, the various forms of alumina, magnesia, zirconia, titanium oxides, boron oxides, titanium oxides, zirconium oxides, aluminum phosphates, kaolin clays, bentonites, montmorillonites, sepiolite, attapulgite, fuller's earth, synthetic porous materials such as $SiO_2$—$Al_2O_3$, $SiO_2$—$ZrO_2$, $SiO_2$—$ThO_2$, $SiO_2$—$BeO$, $SiO_2$—$TiO_2$ or any combination of these compounds. The inorganic matrix may be a mixture of various compounds, in particular an inert phase and an active phase.

The zeolite prepared using the process of the invention may also be associated with at least one other zeolite and act as the principal active phase or an additive.

The metallic phase is introduced onto the zeolite alone, the inorganic matrix alone or the inorganic matrix-zeolite ensemble by ion exchange or impregnation with cations or oxides selected from the following elements: Cu, Ag, Ga, Mg, Ca, Sr, Zn, Cd, B, Al, Sn, Pb, V, P, Sb, Cr, Mo, W, Mn, Re, Fe, Co, Ni, Pt, Pd, Ru, Rh, Os, Ir and any other element from the periodic table of the elements. The metals may be introduced either all in the same manner or using different techniques, at any time during the preparation, before or after forming and in any order. Further, intermediate treatments such as calcining and/or reduction may be applied between deposits of the various metals.

Catalytic compositions comprising the beta zeolite prepared using the process of the invention are generally suitable for carrying out the principal hydrocarbon transformation processes and reactions for the synthesis of organic compounds such as ethers.

Any forming method which is known to the skilled person is suitable for the catalyst comprising the beta zeolite. As an example, it is possible to carry out pelletization or extrusion or bead formation. The catalyst containing the zeolite prepared using the process of the invention at least partially in the acidic form is generally formed into extrudates or beads depending on its intended use.

The invention will now be illustrated by the following examples which are in no way limiting in nature.

Example 1

Synthesis of the Nitrogen-Containing Organic Template,
N,N-Dimethyl-N,N-di(3,3-dimethylbutyl)ammonium hydroxide A mixture was prepared containing 1 g ($0.77 \times 10^{-2}$ moles) of N,N,3,3-tetramethylbutylamine (Aldrich) and 1.917 g ($1.16 \times 10^{-2}$ moles) of 1-bromo-3,3-dimethylbutane (Prolabo) and about 4 ml of isopropanol. Next, 1.23 g ($1.16 \times 10^{-2}$ mole) of sodium carbonate was added. This suspension was heated under reflux for 2 days at a temperature of 100° C. A white solid appeared and after this time, about 5 ml of diethylether was added to the reaction mixture to increase the quantity of precipitate. The isopropanol and diethylether were then evaporated off at 30° C. using a rotary evaporator. The organic product formed was extracted from the reaction mixture using dichloromethane. Three successive extractions with 10 ml of dichloromethane were carried out. The organic phase obtained was evaporated using a rotary evaporator. The white solid formed was washed with dry diethylether and filtered over a nylon membrane (diameter=0.2 µm). 0.8 g ($0.27 \times 10^{-2}$ moles) of N,N-dimethyl-N,N-di(3,3-dimethylbutyl)ammonium bromide (DMDMBA-Br) was obtained. The nature of the species obtained was verified by proton nuclear magnetic resonance; the results of this analysis are given below:

$^1$H NMR ($D_2O$, 400 MHz, 25° C., δ ppm/TMS): 0.83 (s, 18H), 1.51-1.55 (m, 4H), 2.91 (s, 6H), 3.18-3.23 (m, 4H).

An excess of silver oxide ($Ag_2O$) was brought into contact with an aqueous solution of DMDMBA-Br (1.5 mole of $Ag_2O$ for 1 mole of DMDMBA-Br). This mixture was stirred overnight at ambient temperature. The silver bromide which formed was then separated from the solution by centrifuging. The liquid supernatant was a solution of N,N-dimethyl-N,N- di(3,3-dimethylbutyl)ammonium hydroxide. The concentration of this solution was determined by proton nuclear magnetic resonance.

Example 2

Synthesis of a Purely Silicic Beta Zeolite 2.04 g of a 28.3% by weight aqueous solution of N,N-dimethyl-N,N-di(3,3-dimethylbutyl)ammonium hydroxide (ROH) and 1.04 g of tetraethoxysilane (Aldrich) were poured into a polypropylene beaker. The ethanol and excess water were evaporated off at ambient temperature and with stirring until a mass of 1.2525 g was reached. Next, 0.125 g of 40% by weight hydrofluoric acid in water (Fluka) was added and it was stirred until a homogeneous paste was formed. The gel was then transferred to a Teflon jacket then the jacket was placed in a 20 millilitre autoclave. The molar composition of the gel was 1 $SiO_2$: 0.5 ROH: 0.5 HF: 5$H_2O$.

The autoclave was heated for 14 days in an oven at 170° C. During synthesis, the autoclave was stirred continuously, the longitudinal axis of the autoclave rotating at a speed of about 15 rpm in a plane perpendicular to the axis of rotation. The pH for the synthesis was close to 9. After filtration, the product was washed with distilled water and dried overnight at 70° C.

The dried solid product was analyzed by powder X ray diffraction: the crystalline solid obtained was pure beta zeolite.

Example 3

Synthesis of a Purely Silicic Beta Zeolite 4.081 g of a 28.3% by weight aqueous solution of N,N-dimethyl-N,N-di(3,3-dimethylbutyl)ammonium hydroxide (ROH) and 1.04 g of tetraethoxysilane (Aldrich) were poured into a polypropylene beaker. The ethanol and excess water were evaporated off at ambient temperature and with stirring until a mass of 1.836 g was reached. Next, 0.25 g of 40% by weight hydrofluoric acid in water (Fluka) was added and it was stirred until a homogeneous paste was formed. The gel was then transferred to a Teflon jacket then the jacket was placed in a 20 millilitre autoclave. The molar composition of the gel was 1 $SiO_2$: 1 ROH: 1 HF: 5.9$H_2O$.

The autoclave was heated for 14 days in an oven at 170° C. During synthesis, the autoclave was stirred continuously, the longitudinal axis of the autoclave rotating at a speed of about 15 rpm in a plane perpendicular to the axis of rotation. The pH for the synthesis was close to 9. After filtration, the product was washed with distilled water and dried overnight at 70° C.

The dried solid product was analyzed by powder X ray diffraction: the crystalline solid obtained was pure beta zeolite.

Example 4

Synthesis of an Alumino Silicic Zeolite Beta 4.081 g of a 28.3% by weight aqueous solution of N,N-dimethyl-N,N-di(3,3-dimethylbutyl)ammonium hydroxide (ROH), 1.04 g of tetraethoxysilane (Aldrich) and 0.02 g of aluminum isopropoxide (Aldrich) were poured into a polypropylene beaker. The ethanol, propanol and excess water were evaporated off at ambient temperature and with stirring until a mass of 1.76 g was reached. Next, 0.25 g of 40% by weight hydrofluoric acid in water (Fluka) was added and it was stirred until a homogeneous paste was formed. The gel was then transferred to a Teflon jacket then the jacket was placed in a 20 millilitre autoclave.

The molar composition of the gel was 1 $SiO_2$: 0.01 $Al_2O_3$: 1 ROH: 1 HF: 5$H_2O$.

The autoclave was heated for 14 days in an oven at 170° C. During synthesis, the autoclave was stirred continuously, the longitudinal axis of the autoclave rotating at a speed of about 15 rpm in a plane perpendicular to the axis of rotation. The pH for the synthesis was close to 9. After filtration, the product was washed with distilled water and dried overnight at 70° C.

The dried solid product was analyzed by powder X ray diffraction: the crystalline solid obtained was pure beta zeolite.

Example 5

Preparation of a Catalyst from a Beta Zeolite Synthesized in the Si—Al System, with N,N-dimethyl-N,N-di(3,3-dimethylbutyl)ammonium as a Nitrogen-Containing Organic Template The zeolite used in this example was as-synthesised beta zeolite obtained in the Si—Al system of Example 4 comprising N,N-dimethyl-N,N-di(3,3-dimethylbutyl)ammonium in its intracrystalline pores.

This beta zeolite initially underwent dry calcining at 550° C. in a stream of air for 8 hours to eliminate the N,N-dimethyl-N,N-di(3,3-dimethylbutyl)ammonium. The solid obtained was then formed into extrudates by mixing with boemite (Pural SB3, Sasol) in a Z arm mixer and extruding the paste obtained using a piston extruder. The extrudates were then dried at 120° C. for 12 hours in air and calcined at 550° C. for 2 hours in a stream of air in a muffle furnace. They constituted the catalyst support.

Platinum was deposited on the alumina of this support by anionic exchange with hexachloroplatinic acid in the presence of a competing agent (hydrochloric acid). The exchanged support was then dried at 120° C. for 12 hours in air and calcined at 550° C. in a stream of dry air for 1 hour.

The catalyst so prepared was composed of 50% by weight of beta zeolite in its hydrogen form, 49.8% by weight of alumina and 0.2% by weight of platinum.

The preceding examples can be repeated with similar success by substituting the generically or specifically described reactants and/or operating conditions of this invention for those used in the preceding examples.

The entire disclosures of all applications, patents and publications, cited herein and of corresponding French application Ser. No. 07/02.490, filed Apr. 5, 2007 are incorporated by reference herein.

From the foregoing description, one skilled in the art can easily ascertain the essential characteristics of this invention and, without departing from the spirit and scope thereof, can make various changes and modifications of the invention to adapt it to various usages and conditions.

The invention claimed is:
1. A process for preparing a beta zeolite, comprising at least the following steps:
 i) mixing, in an aqueous medium, at least one source of at least one tetravalent element X, at least one source of fluoride anions and at least one quaternary ammonium salt comprising a cation of the formula $(H_3C)_2$—$N^+$—$(CH_2CH_2C(CH_3)_3)_2$; and optionally a trivalent element Y being any of aluminum, iron, boron, indium and gallium; and optionally at least one alkali and/or alkaline earth metal M, ii) treating said mixture hydrothermally until said beta zeolite is formed.

2. A preparation process according to claim 1, in which the quaternary ammonium salt employed to carry out said step i) is N,N-dimethyl-N,N-di(3,3-dimethylbutyl)ammonium hydroxide.

3. A preparation process according to claim 2, in which the tetravalent element X is silicon.

4. A preparation process according to claim 1, in which said source of fluoride anions is hydrofluoric acid.

5. A preparation process according to claim 1, in which at least one source of at least one trivalent element Y is incorporated into the mixture to carry out said step i).

6. A preparation process according to claim 5, in which said element Y is aluminum.

7. A preparation process according to claim 1, in which at least one alkali and/or alkaline-earth metal M is incorporated into the mixture in order to carry out said step i).

8. A preparation process according to claim 1, in which the reaction mixture obtained in step i) has a molar composition expressed by the formula $XO_2$: $vYO_n$: $w\,M_{2/m}O$: $xF^-$; $y\,H_2O$: $zR^+$, in which v is in the range 0 to 0.5, w is in the range 0 to 1, x is in the range 0.05 to 2, y is in the range 1 to 50, z is in the range 0.01 to 6, n is in the range 1 to 3 (n being a whole or rational number), m is equal to 1 or 2, $R^+$ is the quaternary ammonium cation N,N-dimethyl-N,N-di(3,3-dimethylbutyl) ammonium, v, w, x, y and z respectively represent the number of moles of $YO_n$, $M_{2/m}O$, $F^-$, $H_2O$ and $R^+$.

9. A preparation process according to claim 1, in which zeolite seeds are added to the reaction mixture during said step i).

10. A preparation process according to claim 1, in which said hydrothermal treatment in accordance with said step ii) is carried out at a temperature in the range 80° C. to 200° C.

11. A preparation process according to claim 1, in which the solid phase formed from beta zeolite obtained at the end of said step ii) is filtered, washed then dried.

12. A preparation process according to claim 2, in which at least one source of at least one trivalent element Y is incorporated into the mixture to carry out said step i).

13. A preparation process according to claim 12, in which said element Y is aluminum.

14. A preparation process according to claim 13, in which the tetravalent element X is silicon.

15. A preparation process according to claim 14, in which at least one alkali and/or alkaline-earth metal M is incorporated into the mixture in order to carry out said step i).

16. A preparation process according to claim 7, in which at least one source of at least one trivalent element Y is incorporated into the mixture to carry out said step i).

17. A preparation process according to claim 16, in which said element Y is aluminum.

18. A preparation process according to claim 17, in which the tetravalent element X is silicon.

19. A preparation process according to claim 8, wherein v is in the range of 0.01 to 0.3, w is in the range of 0.01 to 0.5, x is in the range of 0.01 to 1.5, y is in the range of 2 to 10 and z is in the range of 0.05 to 4.

20. A preparation process according to claim 1, wherein the aqueous medium consists of $H_2O$, at least one source of at least one tetravalent element X, at least one source of fluoride ions and at least one quaternary ammonium salt of said cation.

* * * * *